United States Patent
Cover et al.

[15] 3,685,519
[45] Aug. 22, 1972

[54] CORN CUTTING MACHINE AND METHOD

[72] Inventors: Paul F. Cover, Tuc Road, Westminster, Md. 21157; John W. Rife, Rte. 1, Severna Park, Md. 21146; Clyde F. Kemper, 195 Franklin Ave., Westminster, Md. 21157; Donald E. Reed, 129 Broadway, Hanover, Pa. 17331

[22] Filed: Aug. 26, 1971

[21] Appl. No.: 175,192

[52] U.S. Cl. ................................. 130/9 A, 146/4
[51] Int. Cl. ................................. A01f 11/06
[58] Field of Search...... 130/9 R, 9 A, 9 B, 9 C, 30 R; 146/4

[56] References Cited

UNITED STATES PATENTS

| | | |
|---|---|---|
| 2,767,716 | 10/1956 | Cover ........................ 130/9 A |
| 2,951,484 | 9/1960 | Cover et al. ............... 130/9 A |
| 3,131,699 | 5/1964 | Cover et al. ............... 130/9 A |

*Primary Examiner*—Antonio F. Guida
*Attorney*—Charles J. Diller et al.

[57] ABSTRACT

This disclosure relates to a novel corn cutting machine which includes means for forcing corn ears longitudinally to and through cutting means with the improvement being the use of yieldable fluidic means for moving the corn through the cutting means thus achieving automatic self-regulation of the applied forces in response to resistance of movement of the corn through the corn cutting means, the yieldable fluidic means being a fluid operated piston and associated piston rod with the latter being retracted more rapidly than during the movement of each ear of corn through the cutting means, and fluidically operated means for holding each corn ear centered relative to the cutting means whereby the inherent yieldable nature of the fluid medium employed permits floating of the holding means and thus equal gripping pressure across the corn ear periphery which precludes choking, jamming, etc.

22 Claims, 6 Drawing Figures

Patented Aug. 22, 1972

INVENTORS
PAUL F. COVER,
JOHN W. RIFE,
CLYDE F. KEMPER
& DONALD E. REED

BY Diller, Brown. Ramirz D. Hart
ATTORNEYS

Patented Aug. 22, 1972

INVENTORS
PAUL F. COVER,
JOHN W. RIFE,
CLYDE F. KEMPER
& DONALD E. REED

BY Dieter, Brown, Ramik & Volt

ATTORNEYS

FIG.5

INVENTORS
PAUL F. COVER, JOHN W. RIFE
CLYDE F. KEMPER & DONALD E. REEL

ATTORNEYS

CORN CUTTING MACHINE AND METHOD

This invention is directed to a novel corn cutting machine for cutting kernels from ears of fresh green corn and constitutes an improvement in corn cutting machines of the type disclosed in U.S. Pat. Nos. 2,951,484 and 3,131,699 in the name of Ralph Cover et al., issued respectively Sept. 6, 1960, and May 5, 1964, and being each assigned to the assignee of the present patent. The machine of these patents utilizes a cutting head in which a series of circumferentially spaced cutting blades are mounted for substantially radial movement and ears to be cut are fed individually through the cutting blades by a reciprocating pusher rod. Each ear of corn is individually fed to the machine and held by two or more ear gripping or engaging members which align each ear with the cutting blades prior to the movement of the pusher rod. Unfortunately, while exceptionally high yield at low cost has been demonstrated by the patented machines over many years of operation, careful examination has indicated the desirability for modifications to achieve greater simplicity, more accurate and repetitive corn ear to cutter alignment, and automatically responsive corn ear gripping and feeding means which collectively prevent chokes, clogging, particularly with respect to nubbins, and do so while at the same time reducing waste to a minimum.

In keeping with the foregoing, a primary object of this invention is to provide a novel corn cutting machine wherein is provided corn cutting means and means for forcing corn ears longitudinally to and through the cutting means, the improvement comprising yieldable fluidic means for moving the forcing means and thus automatically self-regulating the force applied to each ear of corn in response to resistance to movement of the corn through the corn cutting means.

A further object of this invention is to provide a novel machine of the type heretofore described wherein the yieldable fluidic means is in part defined by a fluid chamber, and the forcing means is a piston rod telescopically movable relative to the cylinder.

Still another object of this invention is to provide a novel corn cutting machine of the type heretofore set forth wherein the forcing means is reciprocally moved by the fluidic means in a first direction toward the cutting means and a second direction away from the cutting means, and means are provided for setting the operation of the fluidic means such that the speed of movement of the forcing means is appreciably greater in the second direction as compared with its speed in the first or feeding direction.

Yet another object of this invention is to provide a novel machine including means for gripping corn ears in centered relationship to the cutting means, means mounting the gripping means for movement between an open corn ear receiving position and a closed corn ear gripping position, and yieldable fluidic means for applying a force to the gripping means to yieldably grip a corn ear in the closed position while providing automatic minimal movement, as necessary, during the feeding and cutting operation.

Another object of this invention is to provide a corn ear cutting machine of the type set forth heretofore including conveying means for moving a corn ear to a position above gripping means of the machine, and means responsive to the forcing means away from the cutting means for transferring each corn ear from the conveying means to the gripping means incident to a cutting operation.

A further object of this invention is to provide a novel method of cutting corn by yieldably fluidically gripping a corn ear in longitudinal alignment with corn cutting means, and yieldably fluidically moving the corn ear out of its grip toward and through the corn cutting means.

Still another object of this invention is to provide a novel method of the type aforesaid wherein is included the step of initially supporting each corn ear above and out of alignment with the cutting means, and feeding the lastmentioned corn ear to a position to be gripped and held in longitudinal alignment with the corn cutting means in response to opposite fluidic movement.

With the above and other objects in view that will hereinafter appear, the nature of the invention will be more clearly understood by reference to the following detailed description, the appended claimed subject matter, and the several views illustrated in the accompanying drawings.

Figures 1, 2:
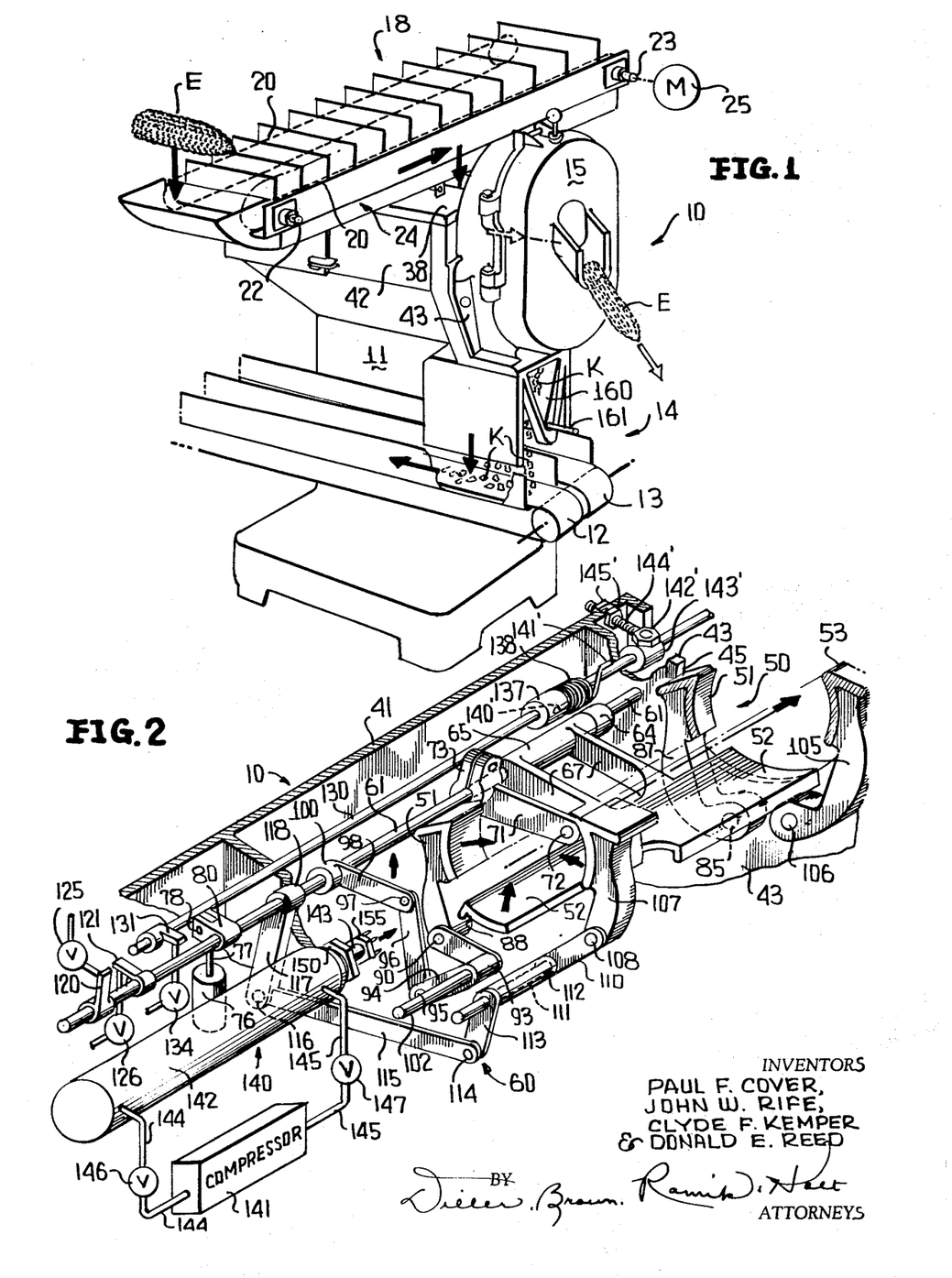
FIG. 1 is a perspective view of a novel corn cutting machine constructed in accordance with this invention, and illustrates means for conveying green ears of corn to the cutting machine with a separator being provided for separating kernels in accordance with size.
FIG. 2 is a fragmentary top perspective view with portions broken away for clarity looking from left-to-right in FIG. 1, and illustrates a linkage mechanism for the corn ear gripping or holding means, and a fluid operated piston rod for feeding each corn ear from left-to-right in this figure.
Figure 4:
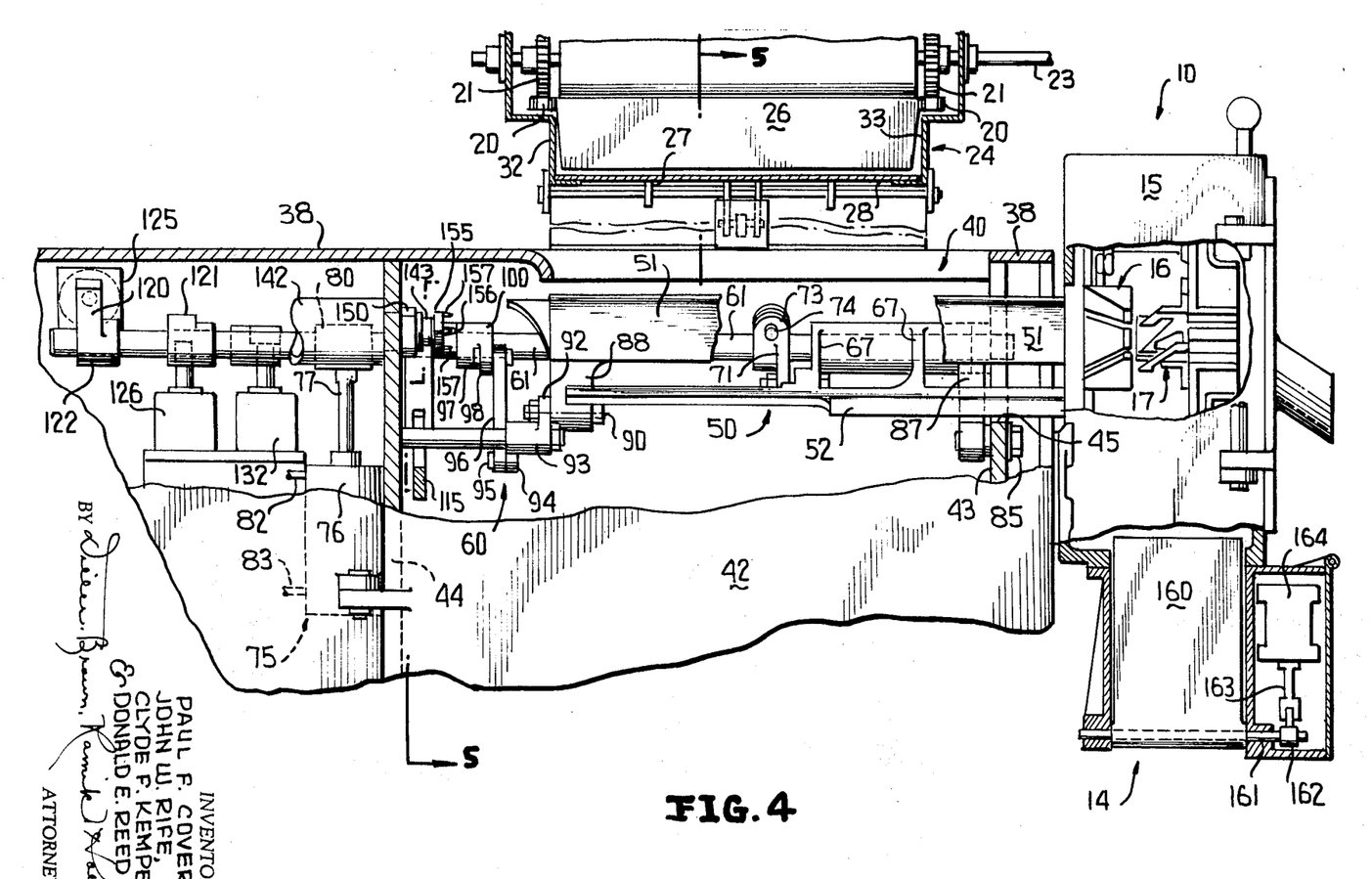
FIG. 4 is a fragmentary sectional view taken generally along line 4—4 of FIG. 3, and additionally illustrates details of the corn cutting mechanism, the conveyor, and the cutting means with the latter relationship to the separator being illustrated in conjunction with a fluid cylinder for operating the separator.

Reference is first made to FIG. 1 of the drawings which discloses a novel corn cutting machine constructed in accordance with this invention which is generally designated by the reference numeral 10. The corn cutting machine 10 includes a base 11 upon which is supported a pair of conveyors 12, 13 which receive kernels K cut from a corn ear or cob E by a separator generally designated by the reference numeral 14. Specific details of the separator or separating means 14 beyond those disclosed herein are found in the latter-noted patents, as are details of a swinging cutting head 15 (FIG. 4) having corn ear depth regulating and/or aligning means 16 and corn cutting means 17 (FIG. 4). The cutting head 15 is hinged to the main base, housing or frame 11 upon the top of which is supported in a conventional manner a conveyor or conveying means generally designated by the reference numeral 18.

The conveying means 18 includes a pair of chains 20, 20 (FIGS. 1 and 4) entrained about suitable sprockets 21 which are in turn conventionally keyed to a pair of shafts 22, 23 journalled for rotation in a conveyor bed 24, with the latter shaft 23 being driven by appropriate conventional motor 25 (FIG. 1). Spanning and pivotally attached to the chains 20, 20 are a plurality of blades or dividers 26 whose lower edges 27 (FIG. 4) are closely adjacent a bottommost plate 28 spanning substantially the entire length of the conveyor bed 24 except for an opening 30 (FIG. 5) formed therein which is normally closed by a gate 31 mounted for pivoting movement between its normally closed position shown in solid lines in FIG. 5 and an open position shown in phantom outline in this same figure. The gate 31 is mounted between side walls 32, 33 (FIG. 4) of the conveyor bed 24 by a pivot pin 34 to which is fixed a slotted link 35. The link 35 receives an end (unnumbered) of a piston rod 36 of a conventional fluid (air) operated piston 37 suitably supported atop an upper wall 38 of the housing 19, it being noted that the wall 38 includes an opening 40 which when in alignment with the gate 31 permits an ear E to drop downwardly atop and upon closed gripping elements 51, 53 of gripping means 50 upon the opening of the gate 31 incident to a feeding and cutting operation.

Referring now specifically to FIGS. 2 through 5 of the drawings, the housing 11 of the cutting machine 10 includes in addition to the upper wall 38 a pair of generally parallel side walls 41, 42, a front wall 43, a medial wall 44 and a rear wall (not shown). The front wall 43 is cut away to define an upwardly opening generally U-shaped opening 45 (FIGS. 2 and 3) through which each corn ear passes as it is forced through the cutting means 17, in the manner to be described more fully hereinafter. The opening 45 also receives end portions of gripping or holding means, generally designated by the reference numeral 50.

Figure 5:
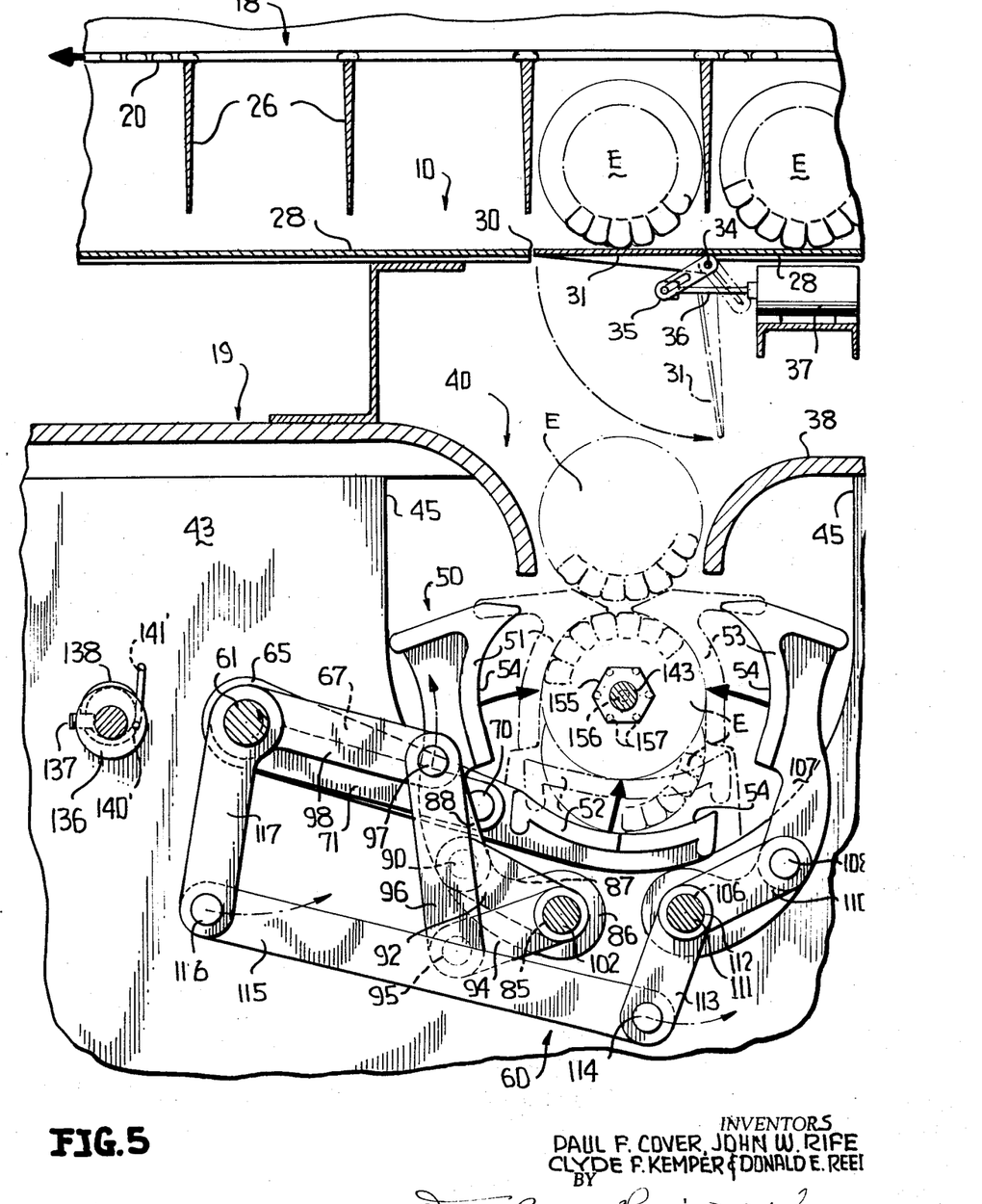
FIG. 5 is an enlarged sectional view taken generally along line 5—5 of FIG. 4, and illustrates the manner in which an appropriate gate is opened to discharge each ear of corn upon one of three holding or gripping means which are eventually closed by the linkage mechanism to center the ear of corn with respect to the piston rod.

The gripping or holding means 50 are defined by three gripping or holding elements 51 through 53, each of which has a rounded convex gripping surface 54 (FIG. 5). The gripping elements 51 through 53 are normally in the open or solid outline position thereof shown in FIG. 5 at which they are respectively disposed at generally 9, 6 and 3 o'clock, but each is mounted for pivoting movement by a linkage mechanism 60 in the manner indicated by the unnumbered headed arrows associated with each of the gripping elements.

The linkage mechanism 60 includes as a portion thereof a main rocker shaft 61 which is mounted for rocking movement in apertures 62, 63 (FIG. 3) of the respective walls 43, 44. One or more conventional locking collars 64 may be fixed to the shaft 61 by radial set screws in a conventional manner to prevent the shaft 61 from moving unnecessarily in an axial direction.

The gripping element 52 is connected to the main rocking shaft 61 by a cylindrical sleeve portion 65 suitably axially apertured or bored at 66 to telescopically receive the shaft 61. A pair of integral arms 67, 67 join the sleeve 65 to the gripping element 52, with the left-handmost arm 67, as viewed in FIG. 3, being provided with a bore 68 through which passes a bolt 70. The bolt 70 in turn passes through a bore (unnumbered) of a link 71 and is secured thereto by a nut 72, it being noted that the link 71 has an upper bifurcated end 73 adjustably fixedly clamped to the main rocker shaft 61 by a bolt 74. As is best viewed in FIG. 5, rocking of the shaft 61 in a counterclockwise direction as viewed in this same figure results in counterclockwise movement being imparted to the link 71 which through the bolt 70 rocks or lifts the gripping element 52 upwardly about an arc whose generatrix is the axis of the shaft 71. The rocking movement is imparted to the main rocking shaft 61 by a fluid motor 75 (FIGS. 3 and 4) having a cylinder 76 secured conventionally to the wall 44 and a reciprocal piston rod 77 whose end (unnumbered) is pivoted by a pivot pin 78 (FIG. 3) to a bifurcated link 80 suitably keyed to the shaft 61. Air introduced into an inlet 82 of the cylinder 76 while venting occurs through an outlet 83 results in the piston 77 being drawn downwardly and counterclockwise motion being imparted to the shaft 61, again as viewed in FIG. 5. Opposite fluidic control, namely, air pressure directed into the cylinder 76 through the conduit or port 83 with venting out of the conduit or port 82 results in upward movement of the piston rod 77 and clockwise motion to the shaft 61 returning the gripping element 52, as well as the gripping elements 51, 53 to their normal or open positions (solid lines in FIG. 5).

The gripping element 51 is pivoted at its end (unnumbered) adjacent the opening 45 to the wall 43 by a suitable bolt and nut 85 joined to a lower terminal end 86 of an arm 87 forming an integral portion of the gripping element 51. At its opposite or leftmost end, as viewed in FIG. 3, the gripping element 51 includes another arm 88 (FIGS. 3 and 4) joined by a nut and bolt 90 passing through a bore 91 thereof to an arm 92 of a link 93 having another arm 94 which is in turn connected by a nut and bolt 95 to another link 96 which is in turn connected by another nut and bolt 97 to a link 98 having a sleeve portion 100 adjustably fixedly secured to the rocker shaft 61 by an appropriate radial set screw 101. The link 93 is mounted for pivotal movement upon a rod 102 which is fixed in a conventional manner in a bore (unnumbered) of the wall 44. By referring specifically to FIG. 5, counterclockwise motion imparted to the shaft 61 by downward movement of the piston 77 in the manner heretofore described results in counterclockwise pivoting of the link 98 which through the pin or bolt 97 moves the link 96 upwardly which in turn through the bolt or pin 95 rotates the link 94 clockwise about the rod 93 with the same motion imparting clockwise movement to the link 92 which in turn pivots the gripping element 51 clockwise through the connection 90 and the integral arm 88 thereof. Thus, the gripping element 51 is moved from its normal solid position in FIG. 5 in the direction of the unnumbered headed arrow associated therewith toward the second phantom outline circle indicative of an ear of corn concentric to the cutting means 17. It is to be noted that the bolt 85 is aligned with the rod 102 and thus the pivoting of the gripping element 51 occurs about the coincident axes of the elements 85, 102.

The final and third gripping element 53 likewise includes an integral arm 105 having an end thereof secured pivotally to the wall 43 by a nut and bolt 106. The opposite or left-hand end of the gripping element 53 as viewed in FIG. 3 includes another integral arm 107 joined by a nut and bolt 108 to a link 110 which is suitably fixed to a rod 111 whose axis is coincident with the axis of the bolt and/or nut 106. The link 110 includes a sleeve 112 which telescopically receives the rod 111 and whose opposite end is connected to another link 113 which in turn is jointed by a pivot connection 114 to another link 115 (FIGS. 2 and 5). The link 115 is in turn connected by another pivot 116 to a link 117 whose sleeve 118 is connected to the main rocker shaft 61 by a suitable radial set screw (not shown). Thus, as is best viewed in FIGS. 2 and 5, counterclockwise rotation of the main rocking shaft 61 causes the link 117 to pivot counterclockwise pushing the link 115 to the right and imparting counterclockwise rotation to the link 113, the sleeve 112 thereof, and the link 110 which in turn is imparted as like motion to the gripping element 53 in the direction of the unnumbered headed arrow associated therewith in FIG. 5.

While the various portions of the linkage mechanism 60 have been described serially, it is to be noted that all motion whether toward opening or closing of the gripping elements 51 through 53 originates from the rocking shaft 61, and thus the movement of the gripping elements 51 through 53 is simultaneous in either clockwise or counterclockwise directions.

The rocking shaft 61 carries a pair of valve actuating arms 120, 121 which include respective sleeve portions 122, 123 fixed to the shaft 61 by set screws 124. The arm 120 is aligned with an air port of an air valve 125 whereas the arm 121 is aligned with an air port of an air valve 126. The function of the valves 125, 126 will be described more fully hereinafter with respect to the description of an operation of the cutting machine 10 as well as the logic circuit thereof of FIG. 6.

A secondary shaft 130 is mounted for rocking movement between the walls 43, 44, and is precluded from shifting axially in any conventional manner. The shaft 130 is parallel to the shaft 61 and includes at its left end (as viewed in FIGS. 2 through 4) an arm 131 in alignment with an air port (unnumbered) of another air valve 132, the arm 131 including as a portion thereof a sleeve 133 which is locked in any desired position of adjustment upon the shaft 130 by a set screw 134.

Figure 3:
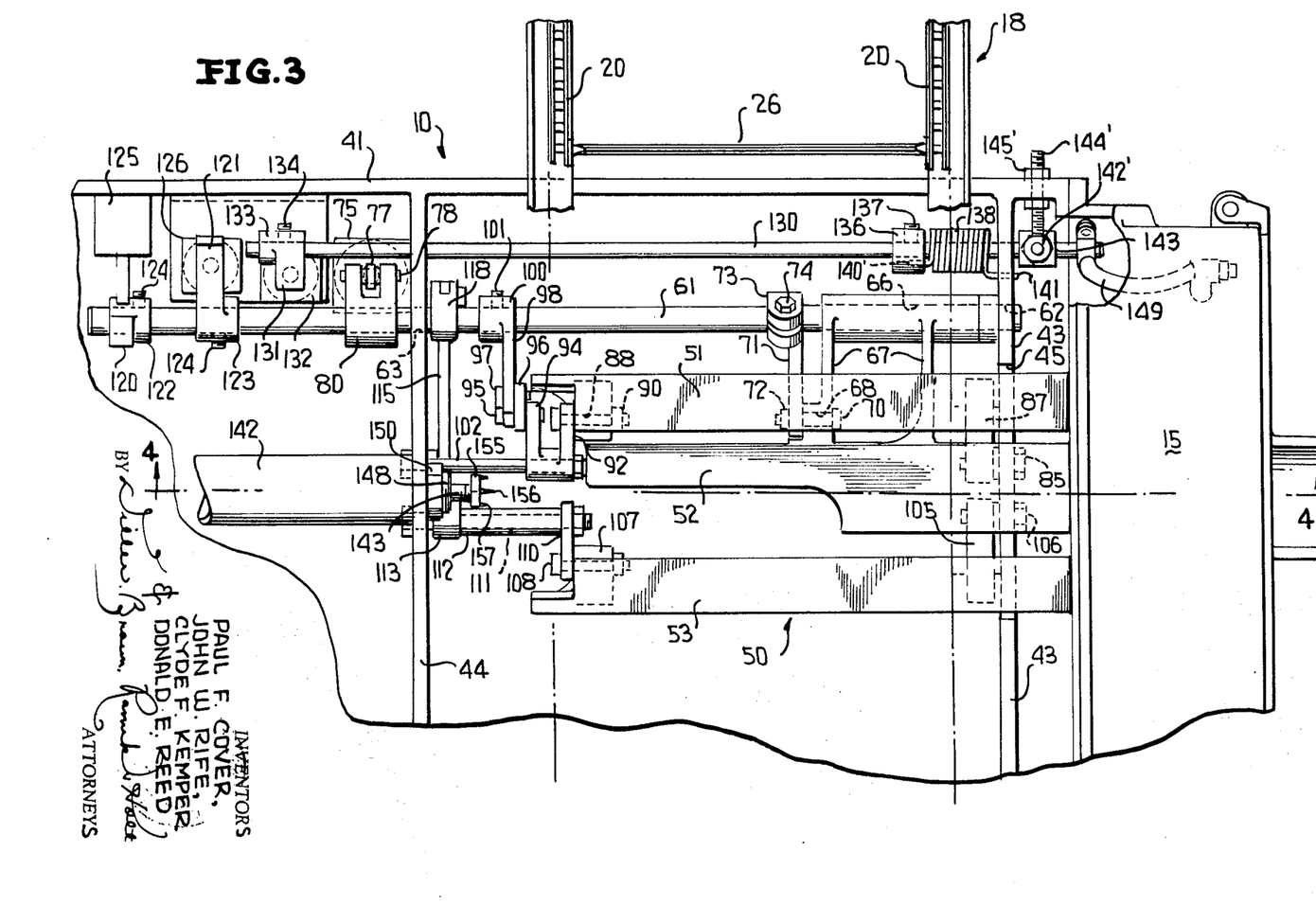
FIG. 3 is a top perspective view looking down at the mechanism of FIG. 2, and more clearly illustrates details of the linkage mechanism along with appropriate valve mechanisms.

At the opposite or right-hand end of the shaft 130, as viewed in FIGS. 2 and 3, is a collar 136 fixed to the shaft 130 by a radial set screw 137. A torsion spring 138 has opposite ends 140', 141' received in bores (unnumbered) of the sleeve 136 and the wall 43. The spring 138 continually biases the shaft 130 in a counterclockwise direction as viewed in FIGS. 2 and 5 of the drawings. This biasing force holds an abutment 142' of a sleeve 143' against an end of a bolt 144' held in any desired position by nuts 145. The sleeve 143' is fixed upon the shaft 130 by a radial set screw (not shown) and thus the abutment 142' may be changed by rotating the sleeve 143' and/or the bolt 144' may be threaded toward or away from the abutment 142'. However, the abutment between the bolt 144' and the abutment 142' establishes the normal operating position of the shaft 130 which is additionally connected by a linkage 149 to a portion of the mechanism 16 corresponding to the element 34a of U.S. Pat. No. 2,951,485 in the name of Paul F. Cover entitled Corn Cutting Head, issued Sept. 6, 1960.

The purpose of the linkage 149 is to prevent the gripping elements 51 through 53 from opening to accept an ear E of corn if the cutting means 17 and/or the depth regulating means 16 are not in a proper position to cut the succeeding ear of corn correctly. For example, if an ear chokes or jams in the means 16 and/or 17 holding the movable elements thereof open more than normal and thus creating a condition where the next ear will not be cut correctly (close to the cob) and might create a choke, then the linkage 149 is pivoted out of position and does not go back to its normal position, as would be the case if an ear had been cut and the cob had properly left the machine after which the means 16 and/or 17 had returned to a normal position. This abnormal position is one in which the valve 134 is closed by the arm 131 resulting in the system 170 preventing the gripping elements 51 through 53 from opening to accept a next ear of corn, as will be described more fully hereinafter. The sensitivity of the linkage 149 is regulated by adjusting the bolt 144' to vary the arc of rotation of the shaft 130 as determined by the abutment of the bolt 144' with the abutment 142'. Thus, this is a protective or safety feature of the invention to keep the next ear from being fed through the means 16 and/or 17 if the latter means are not ready to accept the ear of corn either because the machine is choked, is operating sluggishly for various reasons, etc.

The manner of feeding each ear of corn to the cutting means 17 is by means of a fluid motor, generally designated by the reference numeral 140 which forces each ear of corn from left-to-right as viewed as FIGS. 2 through 4 under the influence of fluidic (air) pressure from fluidic means in the form of an air or similar conventional compressor 141 (FIG. 2). The means 140 includes a cylinder 142 housing a portion of a piston rod 143 and having appropriate ports 144, 145 joined by suitable lines and valves 146, 147, respectively, to the compressor 141. The cylinder 142 is supported in any conventional manner, as by a threaded end portion 148 passing through an opening (unnumbered) in the wall 44 being secured thereto by a large nut 150. The cylinder 142 and the piston rod 143 are, of course, in alignment with the aligning means 16 and the cutting means 17, as well as being in general alignment with the ears of corn as each is held in its gripped or second uppermost phantom outline position in FIG. 5.

The piston rod 143 carries at its exposed end a hexagonally shaped push pad 155 having one central or axial point 156 and one shorter point 157 at each edge of the hexagonal pad or a total of six short points. This arrangement serves to align misaligned corn ears during a feeding cycle when gripped by the gripping elements 51 through 53.

Though considered briefly earlier, it is to be noted that the separating means 14 (FIGS. 1, 2 and 4) includes a separator blade 160 having fixed thereto a pivot rod 161 which is in turn joined by a link 162 to a piston rod 163 of an air operated fluid motor or cylinder 164.

OPERATION

Figure 6:
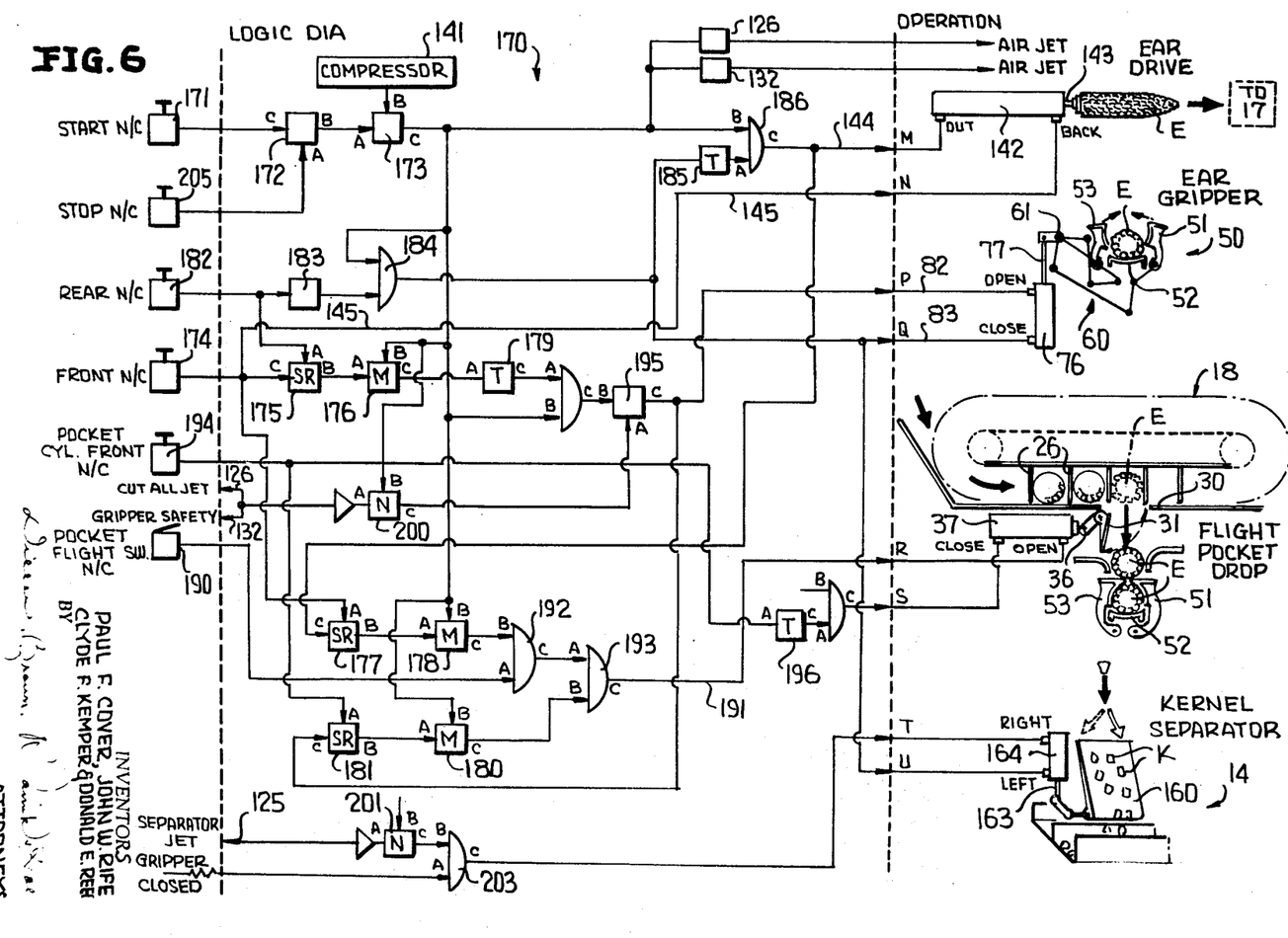
FIG. 6 is a logic diagram of the fluidic logic circuit or system for operating various aspects of the corn cutting machine.

The operation of the cutting machine 10 will be described immediately hereinafter in conjunction with a simultaneous description of the logic circuitry or system 170 of FIG. 6 which is, of course, in part defined by portions of the cutting machine 10 heretofore described. However, for simplicity of description and ease of understanding the numerous conduits of FIG. 6 will be unnumbered since the system 170 is logically laid out and the operativeness is therefore apparent from the drawing itself, and to further assist in the description the operation of the overall system is broken down into a feed or drive portion for imparting motion to the piston rod 143 of the cylinder 142 for feeding each ear of corn to the cutting means 17, a conveyor discharge portion for operating the gate 31 by the cylinder 37 and the piston rod 36 thereof, a safety portion for sensing choking, etc., and a separator portion for kernel separation associated with the cylinder 164 and the piston rod 163, it being noted at this time that the operation of the cylinder 76 and its piston rod 77 for the gripper elements 50 through 53 is essentially related to the overall system and is difficult to separate individually.

DRIVE PORTION OF MACHINE CYCLE

The logic system 170 includes a start button 171 which is depressed to set fluidic memory elements 172, 173 and supply compressed air from a suitable source, such as the compressor 141, to all points in the system requiring compressed air for subsequent operation over the various unnumbered conduits associated therewith. Assuming that the piston rod 143 is in its forward or right-handmost position as viewed in FIGS. 2 through 4 and 6, a normally closed limit trip switch or valve 174 is open and air is conducted through the conduit 145 to retract the piston rod 143 into the cylinder 142 moving the piston 143 to the left as viewed in FIGS. 2 through 4 and 6 with the same output signal from the limit trip valve 174 setting a memory circuit 175, 176, and resetting a memory circuit 177, 178. The output from the now set memory circuits 175, 176 operates through an adjustable time delay 179 to admit air into the cylinder 76 through the conduit 82 and a NOT element 195 of the safety portion of the system to be described hereinafter, to pivot the rock shaft 61 in a counterclockwise direction, as viewed in FIG. 5, and thereby open the gripping elements 51, 52 and 53 incident to receiving an ear of corn therein from the initial position atop the closed elements 51, 53. The output from the memory circuits 175, 176 also sets memory circuits 180, 181. The piston 143 has, of course, moved to its left and in so doing has tripped a limit trip valve 182 resulting in an output signal which is communicated to the cylinder 142 through the conduit 144 and an adjustable time delay mechanism 183 and a succeeding AND gate 184 the output of which is bifurcated to first close the gripper cylinder by actuating the piston rod 77 over the line 83 during which time another time delay mechanism (also adjustable) 185 eventually admits the delayed signal to the drive cylinder 142 through another AND gate 186, resulting in left-to-right movement of the piston rod 143 and thus the movement of an ear of corn E outwardly of the gripping elements 51, 52 and 53 only after the latter have been closed due to the time delay mechanism 185. This same signal sets the memory circuit 177, 178 for subsequent operation.

CONVEYOR LOAD - DISCHARGE PORTION

A conveyor flight switch is suitably positioned adjacent the conveyor 18 and it trips as each blade or pusher 26 approaches the aligned openings 40, 30, with the latter being normally closed by the gate 31. However, the output of the tripping switch 190 does nothing unless the memory circuits 177, 178 and 180, 181 are both set in the manner heretofore described indicating that the gripping elements 51 through 53 have opened and closed and the piston 143 is in its forward position, the latter being proper conditions for subsequent loading upon retraction of the piston 143 in the manner heretofore described and the opening of the gripper elements 51, 52 and 53. If the memory circuits 177, 178 and 180, 181 are both set, the signal from the conveyor flight switch or valve 190 passes to the cylinder 37 over a conduit 191 through two AND gates 192, 193 to operate the piston rod 36 and open the gate 31 for the ear of corn E to be subsequently dropped downwardly upon the gripping element 52 (FIG. 5) for subsequent gripping, pushing and cutting. The inward movement of the piston rod 36 of the cylinder 37 actuates a third limit trip switch or valve 194 with the output thereof resetting the memory circuits 180, 181, and through an adjustable time delay mechanism 196, which is a dwell time for the opening of the gate 31, the pocket or conveyor gate opening rod 36 is returned for the next cycle. As a safety feature, gate 31 opens only during the forward movement of piston 143 and while the gripper elements are closed. The gripper elements open to receive a previously deposited ear only after the push pad 155 has retracted sufficiently to assure that it clears the ear. If no ear is deposited, the mechanism will cycle in the normal manner.

SAFETY PORTION

By referring to FIGS. 3 and 4, the valves 126, 132 are air jet sensors which are normally open to admit the passage of air to atmosphere but can be closed by the respective arms 121, 131 carried by the respective shafts 61, 130. As was heretofore noted, the shaft 130 is connected by the linkage 145 to the depth regulating means 16 which are in turn connected to the cutting means or cutting blades 17 whereas the main rocker shaft 61 operates through the linkage 60 to operate the gripping elements 51, 52 and 53. Thus the air jet sensors 126, 132 are indicators of the status of the gripping means 50 and the depth regulating means 16 and/or the cutting means 17.

A normally passing amplifier element 200 is in the circuit of the air jet sensors 126, 132, as is the NOT gate 195 which is also normally passing. If the amplifier element 200 is not actuated (both valves 126, 132 open) the amplifier 200 will close the NOT gate 195 and block signals normally opening the gripping means 50 by the introduction of pressure into the cylinder 76 over the line 82, thereby setting the load cycle whereupon the machine will continue the cycle but loading will not take place since the piston 77 is not moved to the open position. Thus, irrespective of the reason for the cut-off as, for example, choking at the cutting blade 17, misfeed, etc., cycling will continue but loading of corn from the conveyor to the gripping means 50 will not take place.

If the shaft 130 rotates to a proper position at which the air jet sensor 132 is cut off and if the rocking shaft 61 rotates properly cutting off the air jet sensor 126 by the arm 21, a signal will not pass the NOT gate 200 which in turn allows the NOT gate 195 to pass a proper control signal for loading. Thus, if either of the air jet sensors 126, 132 is open, the amplifier element or NOT gate 200 will not operate thereby preventing further feeding by the machine 10 or the conveyor 18 thereof, even though cycling continues. In this manner, the choke or other stoppage can be removed and cycling can be reinstituted upon any subsequent cycle at which the arms 121, 131 again close both of the air jet sensors 126, 132, respectively.

The valve 125 which is normally open but can be closed by the arm 120 of the rocking shaft 61 is likewise a back pressure air jet sensor which is employed for gauging the outside diameter of each ear of corn and is therefore selectively set at any desired position by the set screw 124. When the gripping elements 51 through 53 are closed, once again by the rotation of the main rocker shaft 61 through the operation of the piston rod 77 and the air jet sensor 125 is closed by the arm 120 an amplifier 201 is actuated, a signal is not passed, and thus the separator piston rod 163 remains immobile. Under the same conditions, except that the air jet is not blocked or closed by the arm 120, thereby indicating a large ear, the amplifier 201 does not actuate allowing the signal to interlock and when combined with the gripper closed signal operating through an AND gate 203 the piston rod 163 is shifted to deflect larger kernels on one of the two conveyors 12, 13 of FIG. 1. The separator 14 returns to its normal position when the piston rod 143 reaches and actuates the limit switch 182.

The machine 10 is, of course, shut down by simply depressing a stop button 205 which also resets the memory circuits 172, 173.

From the foregoing, it will be readily apparent that the present cutting machine 10 is similar in function to the machines set forth in the three commonly assigned patents earlier noted, particularly with respect to the structure and operation of the aligning or depth regulating means 16, the cutting means or cutting blades 17, and the separator 14. However, the entire operability of the cutting machine is predicated upon pressurized air or a like fluid medium as the sole operative power source, whereas in prior conventional machines the power source was electrical resulting in a much more complex mechanism operating less efficiently than the present machine. More specifically, the air fluid medium serves in effect as an air cushion both during gripping and feeding operations, which is highly desirable for accuracy of corn ear presentation to the cutting blades 17 with the resultant less damage of kernels when gripped and/or cut. It is believed rather apparent that simply through the use of air operating in the cylinder 76 there is leeway in the actual force which will be applied to any particular size ear of corn by the gripping elements 51 through 53. In other words, by using air pressure to hold each ear of corn, the grippers 51 through 53 achieve a rather constant pressure around each ear, regardless of size, whereas under past design pressure would be extra light on small ears and extra heavy on large ears. By maintaining an optimum pressure with respect to the present corn cutting machine, there is thus less tendency to bruise and damage kernels.

A like effect is achieved during the movement of the rod 143. In cases of larger ears of corn or if a large or small ear of corn is improperly centered, a greater resistance to movement will normally take place and the rod stroke slows until air pressure builds up within the cylinder 142 and the ear moves through the cutters 17 move slowly until the resistance lowers thus enabling the cutting means to adjust their sensitivity in response to the depth gauging means 16 and to thereby largely and completely correct misalignment so that there is less tendency for each ear of corn to be "rammed" through the cutting blades 17 thereby resulting in a more accurate cut, fewer kernels damaged, and both style and recovery of finished product are thereby improved.

In keeping with the foregoing, the present design also incorporates adjustable bleeder valves in the lines 144, 145 of the cylinder 142 such that upon the introduction of air into the cylinder 142 through, for example, the conduit 144 and the adjustable valve 146 a relatively slow rate of advancement of the piston rod 143 in its feed direction (left-to-right in FIGS. 2 through 4) is effected. However, the valve 147 is adjusted to a more open position such that air is more rapidly introduced into the cylinder 142 through the conduit 145 whereby the return stroke of the piston rod 143 is appreciably faster than the feed stroke, thus lessening overall machine cycle time and thus increasing the number of strokes of the piston rod 143 per a particular time period.

These advantages are, of course, achieved through the use of fewer, less expensive parts and simpler maintenance requirements with the latter being achieved because of the inability of water, moisture, humidity, corrosion, or choking because of juices, cornstarch, corn waste (silks, husks, cobs, etc.) from affecting machine operation as is more inclined to occur in electrical systems.

While preferring forms and arrangements of parts have been shown in illustrating the invention, it is to be clearly understood that various changes in details and arrangement of parts may be made without departing from the spirit and scope of this disclosure.

We claim:

1. In a machine for cutting corn wherein is provided corn cutting means and means for forcing corn ears longitudinally to and through the cutting means, the improvement comprising yieldable fluidic means for moving said forcing means and automatically self regulating the force applied in response to resistance to movement of corn ears through said corn cutting means.

2. The improvement in a machine as defined in claim 1 wherein said yieldable fluidic means is in part defined by a fluid chamber, and said forcing means is a piston rod telescopically movable relative to said cylinder.

3. The improvement in a machine as defined in claim 1 wherein forcing means is reciprocally moved by said fluidic means in a first direction toward said cutting means and a second direction away from said cutting means, and means for setting the operation of said fluidic means such that the speed of movement of said forcing means is appreciably greater in said second direction as compared with its speed in said first direction.

4. The improvement in a machine as defined in claim 1 including means for selectively adjusting the force of said fluidic means to varying the speed of movement of said forcing means.

5. The improvement in a machine as defined in claim 1 including means for holding corn ears centered with relation to the cutting means, means mounting said holding means for movement between an open corn ear receiving position and a closed corn ear gripping position, and yieldable fluidic means for applying a force to said holding means to yieldably grip a corn ear in said closed position.

6. The improvement in a machine as defined in claim 1 including means for separating kernels cut from large and small corn ears by said cutting means, said separating means being a pivotally mounted deflecting vane beneath said cutting means, and fluidic means for pivoting said vane.

7. The improvement in a machine as defined in claim 1 including means for holding corn ears centered with relation to the cutting means, means for supporting a corn ear above said holding means, and means responsive to the movement of said forcing means away from said cutting means for transferring a corn ear from said supporting means to said holding means.

8. The improvement in a machine as defined in claim 2 wherein forcing means is reciprocally moved by said fluidic means in a first direction toward said cutting means and a second direction away from said cutting means, and means for setting the operation of said fluidic means such that the speed of movement of said forcing means is appreciably greater in said second direction as compared with its speed in said first direction.

9. The improvement in a machine as defined in claim 2 including means for selectively adjusting the force of said fluidic means to varying the speed of movement of said forcing means.

10. The improvement in a machine as defined in claim 2 including means for holding corn ears centered with relation to the cutting means, means mounting said holding means for movement between an open corn ear receiving position and a closed corn ear gripping position, and yieldable fluidic means for applying a force to said holding means to yieldably grip a corn ear in said closed position.

11. The improvement in a machine as defined in claim 2 including means for separating kernels cut from large and small corn ears by said cutting means, said separating means being a pivotally mounted deflecting vane beneath said cutting means, and fluidic means for pivoting said vane.

12. The improvement in a machine as defined in claim 2 including means for holding corn ears centered with relation to the cutting means, means for supporting a corn ear above said holding means, and means responsive to the movement of said forcing means away from said cutting means for transferring a corn ear from said supporting means to said holding means.

13. The improvement in a machine as defined in claim 3 including means for selectively adjusting the force of said fluidic means to varying the speed of movement of said forcing means.

14. The improvement in a machine as defined in claim 3 including means for holding corn ears centered with relation to the cutting means, means mounting said holding means for movement between an open corn ear receiving position and a closed corn ear gripping position, and yieldable fluidic means for applying a force to said holding means to yieldably grip a corn ear in said closed position.

15. The improvement in a machine as defined in claim 3 including means for holding corn ears centered with relation to the cutting means, means for supporting a corn ear above said holding means, and means responsive to the movement of said forcing means away from said cutting means for transferring a corn ear from said supporting means to said holding means.

16. A method of cutting corn comprising the steps of yieldably fluidically gripping a corn ear in longitudinal alignment with corn cutting means, and yieldably fluidically moving the corn ear out of its grip toward and through the corn cutting means.

17. The method of cutting corn as defined in claim 16 including the step of initially supporting each corn ear above and out of alignment with the cutting means, and feeding the last-mentioned corn ear to a position to be gripped and held in longitudinal alignment with the corn cutting means in response to opposite fluidic movement.

18. The improvement in a machine as defined in claim 2 wherein said piston rod has a piston end and a rod end, and said rod end has means for aligning a misaligned corn ear with said cutting means.

19. The improvement in a machine as defined in claim 18 wherein said aligning means includes a plurality of projecting fingers of which one is axially located and is longer than the remaining fingers.

20. The improvement in a machine as defined in claim 5 wherein both said yieldable fluidic means are in part defined by a fluid chamber, and said forcing and force applying means are defined each by a piston rod telescopically movable relative to its associated cylinder.

21. In a machine for cutting corn wherein is provided corn cutting means, means for adjusting said corn cutting means, means for grippingly supporting each corn ear, means for forcing corn ears from said supporting means to and through said cutting means, the improvements comprising yieldable fluidic means for operating said adjusting, gripping and forcing means, and fluidic logic circuit means for sequentially operating gripping, adjusting and forcing means.

22. The improvement in a machine as defined in claim 21 wherein said yieldable fluidic means is in part defined by a fluid chamber and piston rod associated with each adjusting, gripping and forcing means.

* * * * *

PO-1050
(5/69)

UNITED STATES PATENT OFFICE
CERTIFICATE OF CORRECTION

Patent No. 3,685,519            Dated    August 22, 1972

Inventor(s) PAUL F. COVER, JOHN W. RIFE, CLYDE F. KEMPER & DONALD E. REED

It is certified that error appears in the above-identified patent and that said Letters Patent are hereby corrected as shown below:

On the Abstract page, read the following: -- [73] Assignee: THE UNITED COMPANY, Westminster, Maryland --

Signed and sealed this 3rd day of April 1973.

(SEAL)
Attest:

EDWARD M. FLETCHER, JR.
Attesting Officer

ROBERT GOTTSCHALK
Commissioner of Patents